(12) United States Patent
Katsura

(10) Patent No.: US 6,628,962 B1
(45) Date of Patent: Sep. 30, 2003

(54) PDA ANTENNA DEVICE FOR SWITCHING BETWEEN ANTENNAE OF A PDA UNIT BASED ON DETECTED USE CONDITION

(75) Inventor: Takatoshi Katsura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/367,521

(22) PCT Filed: Dec. 24, 1997

(86) PCT No.: PCT/JP97/04790

§ 371 (c)(1),
(2), (4) Date: Aug. 16, 1999

(87) PCT Pub. No.: WO99/34525

PCT Pub. Date: Jul. 8, 1999

(51) Int. Cl.[7] .................................................. H04B 1/38
(52) U.S. Cl. ........................ 455/556; 455/553; 455/575
(58) Field of Search ............................... 455/566, 557, 455/536, 466, 575, 90; 340/568.1, 5.74, 539, 571, 825

(56) References Cited

U.S. PATENT DOCUMENTS

| | | | | |
|---|---|---|---|---|
| 5,559,501 A | * | 9/1996 | Barzegar et al. | 340/825 |
| 5,561,436 A | * | 10/1996 | Phillips | 343/702 |
| 5,561,437 A | * | 10/1996 | Phillips et al. | 343/702 |
| 5,617,102 A | * | 4/1997 | Prater | 342/374 |
| 5,748,084 A | * | 5/1998 | Isikoff | 340/568 |
| 5,894,595 A | * | 4/1999 | Foladare et al. | 455/414 |
| 5,905,467 A | * | 5/1999 | Narayanaswamy et al. | 343/702 |
| 6,006,117 A | * | 12/1999 | Hageltorn et al. | 455/575 |
| 6,249,276 B1 | * | 6/2001 | Ohno | 345/173 |

FOREIGN PATENT DOCUMENTS

| | | |
|---|---|---|
| JP | 621863 | 1/1994 |
| JP | 8129624 | 5/1996 |
| JP | 8 153075 A | 6/1996 |
| WO | WO 93/01659 * | 1/1993 ............ H04B/1/38 |

OTHER PUBLICATIONS

Lee, H.F., et al., "Advances in Microstrip and Printed Antennas", John Wiley & Sons Inc., 1997, pp. 2, 3, 72, 142.

* cited by examiner

Primary Examiner—Edward F. Urban
Assistant Examiner—Tilahun Gesesse
(74) Attorney, Agent, or Firm—Rothwell, Figg, Ernst & Manbeck

(57) ABSTRACT

A PDA use antenna device comprising a first antenna for use in a first use configuration, a second antenna for use in a second use condition, a control part which discriminates between said first use condition and said second use condition and outputs a discrimination signal and a antenna selection device which selects which one of said first antenna and said second antenna should be used on the basis of the discrimination signal of said control part and connects the selected antenna to the wireless circuit. By selecting and using the optimal antenna for each use condition, use conditions can be easily discriminated. Moreover improved and stable antenna reliability can be ensured irrespective of use condition.

9 Claims, 7 Drawing Sheets

FORWARD SURFACE ← → BACK SURFACE

FORWARD SURFACE ← → BACK SURFACE

FORWARD SURFACE ← → BACK SURFACE

PDA ANTENNA DEVICE FOR SWITCHING BETWEEN ANTENNAE OF A PDA UNIT BASED ON DETECTED USE CONDITION

FIELD OF THE INVENTION

The present invention relates to a PDA antenna adapted for use in a portable communication terminal called a PDA (Personal Digital Assistants).

BACKGROUND TO THE INVENTION

Up to the present time, many kinds of relatively small portable communication terminals called PDA have been put into use. Such PDAs can process digital information with respect to letters, images or sounds and provide such functions as wireless data communication and telephone communication and "touch input" or "pen input" functions.

FIG. 9 is a perspective view showing a PDA provided with a conventional PDA antenna. FIG. 10 is a side view showing a PDA provided with a conventional PDA antenna. FIG. 11 is a side view showing a PDA in the course of telephone communication. FIG. 12 is a perspective view showing a PDA in the course of data communication. FIG. 13 is a perspective view showing a PDA with a built-in loop antenna.

In FIGS. 9–13, reference numeral 31 is the body of a PDA, 32 is a display screen showing letters and images and provided with a "touch input" function, 33 is a microphone for inputting sounds and 34 is a speaker for outputting sounds. The display screen 32, microphone 33 and speaker 34 are provided on the front surface of the body 31.

35 is an extendable/storable antenna used for telephone communication or data communication and capable of being extended from or stored in the body 31. L1 is the distance from the center axis of the antenna 35 to the front surface of the body 31, L2 is the distance from the center axis of the extendable/storable antenna 35 to the back surface of the body 31 and is constructed so that L1>L2. This construction is due to the fact that it is necessary to ensure the gain of the antenna by locating the extendable/storable antenna 35 as far as possible from the user's face 36 which interferes with the electronic waves as shown in FIG. 11.

37 is a built-in auxiliary antenna maintaining high gain when the gain of the extendable/storable antenna is greatly reduced due to the presence of some kind of interference obstacle.

An electrostatic capacity sensor (not shown) which detects interference obstacles and an antenna switching switch (not shown) which switches antennas between the extendable/storable antenna 35 and the built-in antenna 37 are also provided in the body 31. Their method of application is similar to that used in the wireless telephone device disclosed for example in JP-A-6-21863.

Furthermore, in FIGS. 12 and 13, 38 is an interference obstacle such as a desk mounting the body 31 during data communication for example.

In FIG. 13, 39 is a loop antenna forming the above-mentioned built-in antenna 37 in loop shape.

The operation of the invention will now be explained.

When talking on the telephone, the user holds the body 31 of the PDA in their hand, speaks into the microphone 33 and hears received sounds from the speaker 34 as shown in FIG. 11. Subsequently the extendable/storable antenna 35 is extended to a fixed length from the body 31. This ensures optimal communication conditions as does the fact that when the gain of the extendable/storable antenna is greatly reduced due to the existence of an interference obstacle, the antenna switching switch (not shown) automatically switches the built-in antenna 37 or the loop antenna 39.

Otherwise during data communication, as shown in FIGS. 12 and 13, the user mounts the body 31 of the PDA on an interference obstacle 38 such as a desk and using the display screen, inputs, confirms and communicates data.

Conventional antenna devices used in conjunction with PDAs are constructed as above. Although it is easy to ensure a determined antenna gain when communicating by telephone, when the body 31 is placed on an interference obstacle 38 when communicating data, the distance between the extendable/storable antenna 35 and the interference obstacle 38 reduces to L2, the gain of the extendable/storable antenna 35 is reduced and the reliability of the data communication is reduced.

Furthermore it is difficult to ensure sufficient antenna reliability of the built-in antenna 37 or the loop antenna 39 which should supplement reduced gain of the extendable/storable antenna 35. This is due to such factors as the distance from the interference obstacle 38 or the material constituting the interference obstacle 38 (for instance whether it is metal or not). Also the decision standard for switching the antennas becomes complicated due to the fact that the sensing means for the interference obstacle 38 is dependent on the material constituting the interference obstacle 38.

It is an object of the present invention to solve the above problems by the provision of a PDA antenna device which can easily ensure improved and stable antenna reliability irrespective of such use conditions as telephone or data communication.

DISCLOSURE OF THE INVENTION

The present invention comprises a first antenna used in a first use condition, a second antenna used in a second use condition, a control part which discriminates between the first and second conditions and outputs a discrimination signal and a antenna selection device which selects which of the first and second antennas to use on the basis of the discrimination signal from the control part and connects the selected antenna to the wireless circuit. The invention is adapted to select and use the optimal antenna for each use condition. By such a process, it is possible to easily obtain the discrimination of use conditions and ensure improved and stable antenna reliability irrespective of use conditions.

Further the invention comprises an antenna used in a first and second use condition, a first conforming circuit conforming to a first use condition, a second conforming circuit conforming to a second use condition, a control part which discriminates between the first and second use conditions and outputs a discriminating signal and a conforming circuit selecting device which selects which of the first and second conforming circuits to use on the basis of the discriminating signal from the control part and connects the selected antenna to the wireless circuit through the selected conforming circuit. Thus the invention is adapted to use an antenna by selecting the optimal conforming circuit for each use condition. Hence discrimination of use conditions can easily be obtained, and optimal conformance to each use condition as well as improved and stable antenna reliability can be easily ensured.

The use conditions of the PDA comprise at least data communication, telephone communication, data communication/telephone communication carrying out data communication and telephone communication, and data processing comprising the processing of fixed data before data communication or data communication/telephone communication. Telephone communication is a first use condition, data communication and data communication/ telephone communication is a second use condition, and data processing is a first or second use condition. In such a way, it is possible to obtain optimum antenna reliability corresponding to various use conditions.

In the present invention, the second antenna is formed in a bar shape adjustable at least with respect to one of the angle to or the direction from the interference obstacle. In such a way, by this simple structure it is possible to ensure the improved reliability of the second antenna.

The invention provides for the storage of the second antenna in the body. As a result it is possible to prevent the second antenna from projecting from the body and hindering portability when the PDA is carried.

The present invention provides for an antenna installation cover on the body which can optionally change its orientation with respect to the interference obstacle. The second antenna may be provided on the rear surface or in the interior of the antenna installation cover. In such a way, optimal orientation of the second antenna can be easily ensured with respect to the interference obstacle by the optional changing of the orientation of the antenna installation cover and so improved and stable antenna reliability can be ensured.

The second antenna of the present invention is formed with respect to the antenna installation cover by printing, deposition or transferal. Hence it is possible to easily form an extremely thin second antenna and this contributes to the small size and weight of the PDA.

The present invention further provides for a second antenna on one part of the body which optionally changes its orientation with respect to the interference obstacle. A second antenna for the PDA function has been provided by using an indispensable part of the body. In order to provide the antenna a separate member is no longer necessary. This allows a reduction in the number of parts, the simplification of the structure of the PDA unit and a reduction in its weight.

Further the second antenna is formed by printing, deposition or transferal on a part of the body. In such a way an extremely thin second antenna can be easily formed and the size and weight of the PDA can be reduced.

The present invention provides a control part having an orientation sensor which detects the orientation of the body in order to discriminate between a first and second use condition. In such a way it is possible to automatically discriminate the use condition.

SIMPLE EXPLANATION OF THE FIGURES

PREFERRED EMBODIMENTS OF THE INVENTION

In order to explain the invention in more detail, the preferred embodiments will be explained with reference to the accompanying drawings.

Embodiment 1

Figure 1:
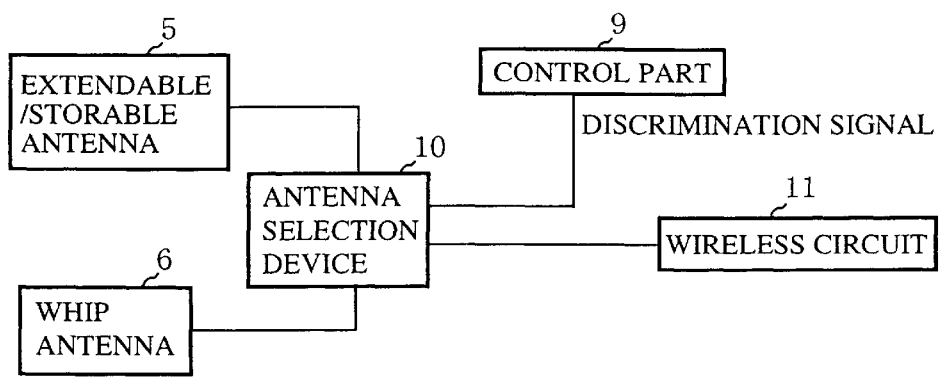
FIG. 1 is a block diagram showing the antenna device for use with a PDA according to the first embodiment of the invention.
Figure 2:
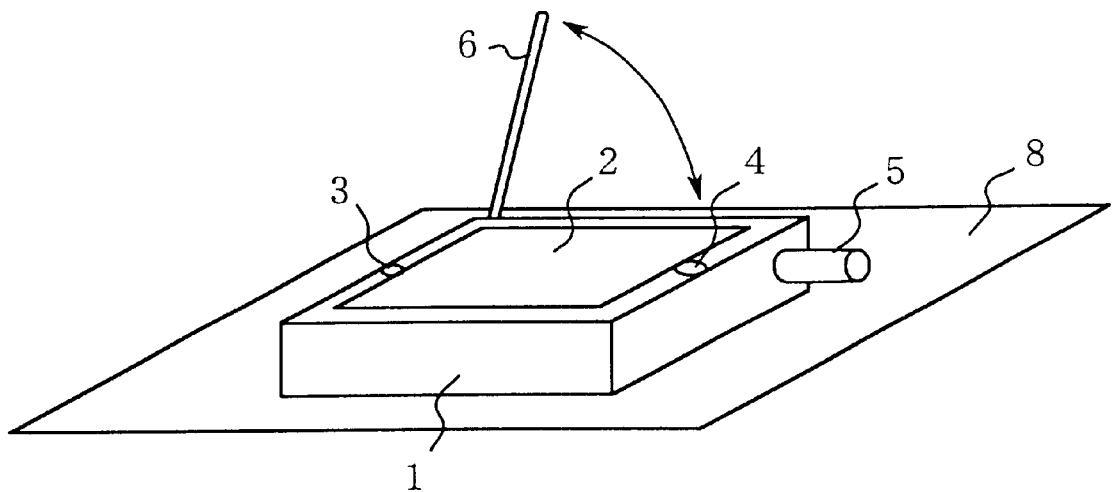
FIG. 2 is a perspective view showing the use condition of the antenna device for use with a PDA during data communication.

FIG. 1 is a block diagram showing the antenna device for use with a PDA according to a first embodiment of the invention. FIG. 2 is a perspective view showing the use condition of the antenna device for use with a PDA during data communication.

Firstly with reference to FIG. 2, the overall structure of the adapted PDA of the present invention will be explained. In FIG. 2, reference numeral 1 denotes the body of the PDA, 2 is the display screen having a "touch" or "pen" input function and displaying images or letters, 3 is a microphone inputting sounds, 4 is a speaker outputting sounds. The display screen 2, the microphone 3 and the speaker 4 are provided on the front surface of the body 1.

5 is an extendable/storable antenna (first antenna) used during telephone communication (first use condition) and extendable or storable in the body 1.

6 is a pole-shaped whip antenna (second antenna) used during data communication ( second use condition) with the distance and angle adjustable with respect to the interference obstacle discussed below. In other words, the base of the whip antenna 6 is freely rotatable on the side face of the body 1 and has optional stationary orientations. The whip antenna 6 is storable in the side face of the body 1 when not in use. For example this may be made possible by the provision of a groove or space in the body 1 in order or store the whip antenna 6.

8 is an interference obstacle such as a desk or a person's knee on which the body 1 is mounted during data communication.

The main components of the invention will be explained with reference to the accompanying drawings.

In FIG. 1, reference numeral 9 denotes a control part which discriminates use conditions such as telephone communication or data communication and outputs a discrimination signal. In other words when the user is carrying out telephone communication or data communication, it is necessary to select beforehand telephone mode or data communication mode on the basis of the display of the display screen 2. This is usually performed by the user's touch or pen input and is adapted to easily discriminate use conditions on the basis of discriminating the input signal.

10 is an antenna selection device which selects which of the extendable/storable antenna 5 and the whip antenna 6 to use on the basis of the discrimination signal from the control part 9 and connects the selected antenna to the wireless circuit 11. In other words, the antenna selection device 10 selects the extendable/storable antenna 5 during telephone communication and connects it to the wireless circuit 11 and selects the whip antenna 6 during data communication and connects it to the wireless circuit 11. The control part 9, the antenna selection device 10 and the wireless circuit 11 are provided in the body 1.

The means of achieving the basic functions of a PDA such as telephone communication or data communication is by the application of known and applied techniques.

The operation of the invention will now be explained.

When the user is carrying out telephone or data communication, they select beforehand telephone communication mode or data communication mode on the basis of the display of the display screen 2. The selection is performed by touch or pen input.

The input signal is classified by the control part 9 and the use condition is easily discriminated.

The antenna selection device 10 selects which of the extendable/storable antenna 5 or the whip antenna 6 to use on the basis of the discrimination signal from the control part 9 and connects it to the wireless circuit 11. In other words the antenna selection device 10 selects the extendable/storable antenna 5 during telephone communication and connects it to the wireless circuit 11. During data communication, it selects the whip antenna 6 and connects it to the wireless circuit 11.

Hence the use condition can be easily discriminated, the optimal antenna selected for each use condition and improved and stable antenna reliability easily ensured.

Embodiment 1 above provides the advantages that use conditions may be easily discriminated and improved and stable antenna reliability can be easily ensured irrespective of the use condition.

Furthermore the distance and angle of the whip antenna 6 is optionally adjustable with respect to the interference obstacle and improved and stable antenna reliability can be ensued by a simple structure.

In addition the whip antenna 6 is storable in the body 1 and thus may be prevented from projecting from the body 1 when the PDA is being carried and as a result from diminishing its portability.

Embodiment 1 above was explained on the basis of telephone communication and data communication being first and second use conditions respectively. However the invention is not limited in this respect. In other words, at least data communication/telephone communication carrying out data communication and telephone communication, or data processing of determined data before data communication or data communication/telephone communication operations may be considered as use conditions of the PDA apart from data communication and telephone communication.

Hence it is possible to designate data communication/telephone communication as a second use condition and data processing as a first or second use condition. And for the same reasons as outlined above, discrimination of the use condition is easily obtained and improved and stable antenna reliability can be easily ensured.

The discrimination of the use condition was explained on the basis of the input signal being due to user input operation. The invention is not however limited in this respect and the discrimination of the use condition may be automatically performed from the orientation of the body 1 for example by the provision of an angle sensor (orientation sensor) (not shown) in the control part 9 which detects the orientation of the body 1.

Embodiment 2

Figure 3:
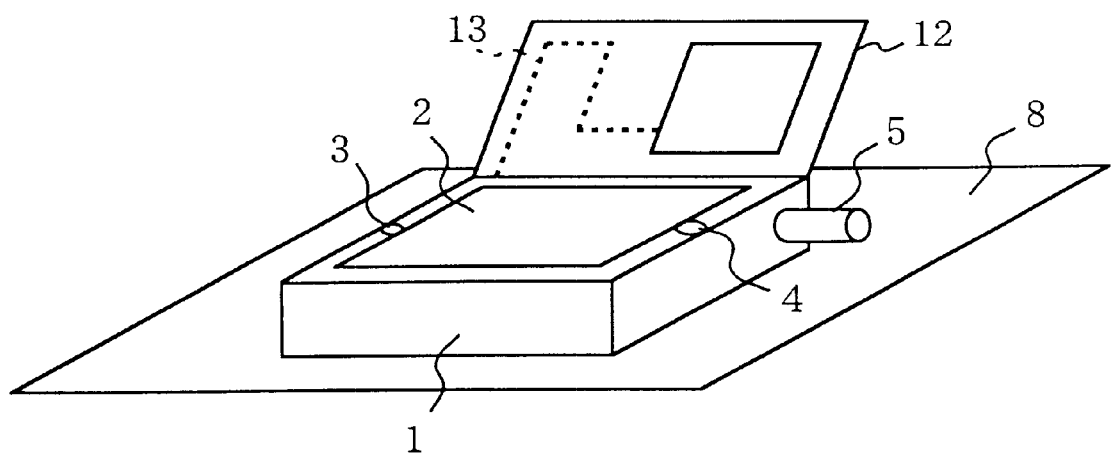
FIG. 3 is a perspective view showing the use condition of the antenna device for use with a PDA during data communication according to a second embodiment of the invention.

FIG. 3 is a perspective view showing the use condition during data communication of an antenna device for use with a PDA according to a second embodiment of the present invention. In the following explanation, elements similar to those already explained will be simply represented by similar numerals.

In FIG. 3 reference numeral 12 represents a thin sheet antenna installation cover, the orientation of which may be optionally changed with respect to the interference obstacle 8. In other words one end of the antenna installation cover 12 is held in an freely rotatable position with respect to the body 1 and may be placed in an optional stationary position.

13 is a cover antenna for data communication (second antenna) formed in a plane shape inside the antenna installation cover 12 by one of printing, deposition and transferal and is used during data communication.

Other components are the same as those as explained in regards to embodiment 1 and will not be discussed here.

The operation of the invention will now be explained.

During data communication, the body 1 is placed and the antenna installation cover 12 is opened. The optional change of its orientation allows the adjustment of the distance and angle of the antenna used for data communication 13 with respect to the interference obstacle 8 and ensures both optimum orientation and improved and stable antenna reliability.

Other functions of the invention are the same as in embodiment 1 and their explanation will not be repeated here.

As shown above, according to embodiment 2, by optionally changing the orientation of the antenna installation cover 12, it is possible to easily ensure optimal orientation of the data communication use cover antenna 13 with respect to an interference object 8 and improved and stable antenna reliability.

Furthermore, as the data communication use cover antenna 13 is formed in a plane shape inside the antenna installation cover 12 by any one of printing, deposition and transferal, it is possible to easily form an extremely thin antenna and reduce the size and weight of the PDA unit.

In embodiment 2 above, although the data communication use cover antenna 13 was explained on the basis of being provided inside the antenna installation cover 12, it is not so limited and may be provided on the surface of the antenna installation cover 12.

Furthermore the use condition of embodiment 2 is not limited to telephone communication and data communication and may equally be applied to data communication/telephone communication or data processing.

The present embodiment is the same as embodiment 1 above in that an angle sensor (orientation sensor) (not shown) discriminates the use condition.

Embodiment 3

Figure 4:
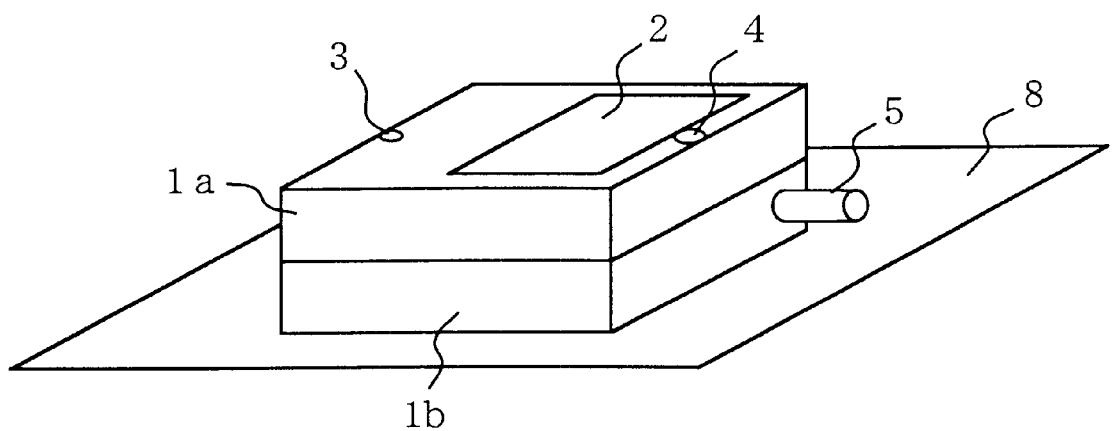
FIG. 4 is a perspective view showing the PDA used with an antenna device for a PDA in the closed position according to a third embodiment of the invention.
Figure 5:
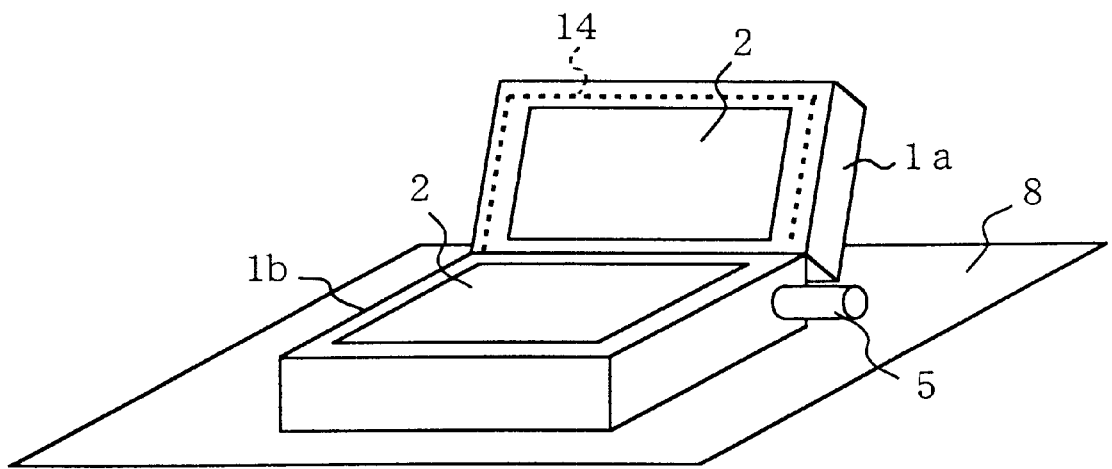
FIG. 5 is a perspective view showing the use condition of the antenna device for a PDA during data communication.

FIG. 4 is a perspective view showing the closed state of a PDA used in a PDA use antenna device according to the third embodiment of the invention. FIG. 5 is a perspective view showing the use condition during data communication of the PDA use antenna device.

In FIGS. 4 and 5, 1*a* is the front surface of the body (a part of the body), 1*b* is the back surface of the body. Both are connected by a hinge or the like (not shown). In other words, an end of the front surface of the body 1*a* is maintained in free rotation by the back surface of the body 1*b* and may be maintained in an optional stationary position. The front surface of the body 1*a* differs from the antenna device cover 12 provided in the second embodiment as a data communication cover antenna 13. It is provided on the display screen 2 and is conventionally an indispensable element for PDA function.

14 is the inside of the front surface of the body 1*a* and is a wire antenna (second antenna) in the body for data communication provided on the outer rim of the display screen 2 and is formed by printing, deposition or transferal. This antenna is used during data communication.

In this way, embodiment 3 provides a data communication body antenna 14 inside the front surface of the body 1*a*. Hence there is no need to provide a special antenna element.

Other structures of the invention are the same as embodiment 1 above and will not be explained here.

The operation of the invention will now be explained. During data communication, the back surface of the body 1*b* is placed, the front surface of the body 1*a* is opened and by optional orientation, it is possible to adjust the distance and angle of the data communication body antenna 14 with respect to the interference obstacle and to ensure its optimal orientation. Hence improved and stable antenna reliability can be ensured.

Other operations are the same as embodiment 1 above and will not be explained here.

In this way, according to embodiment 3, the orientation of the front surface of the body 1*a* may be optionally changed and thus optimal orientation of the data communication body antenna 14 with respect to the interference obstacle 8 may be easily ensured and improved and stable antenna reliability can be achieved.

The provision of the data communication body antenna 14 by using the front surface of the body 1*a* which has traditionally been essential for the functioning of the PDA obviates the need for a special member in order to provide the antenna. The number of parts is reduced, the structure of the PDA itself is simplified and its weight is reduced.

Furthermore since the data communication body antenna 14 is provided in a wire shape inside the front surface of the body 1*a* by any one of printing, deposition or transferal, it is possible to easily form an extremely thin antenna and reduce the size and weight of the PDA.

In embodiment 3 above, the data communication body antenna 14 was explained as being provided inside the front surface of the body 1*a*. However it is not so limited and may be provided on the surface of the front of the body 1*a*.

The conditions of use in embodiment 3 are not limited to telephone communication and data communication and may be applied to data communication/telephone communication and data processing.

An angle sensor (orientation sensor) (not shown) is used to discriminate conditions of use in the same manner as embodiment 1 above.

Embodiment 4

Figure 6:
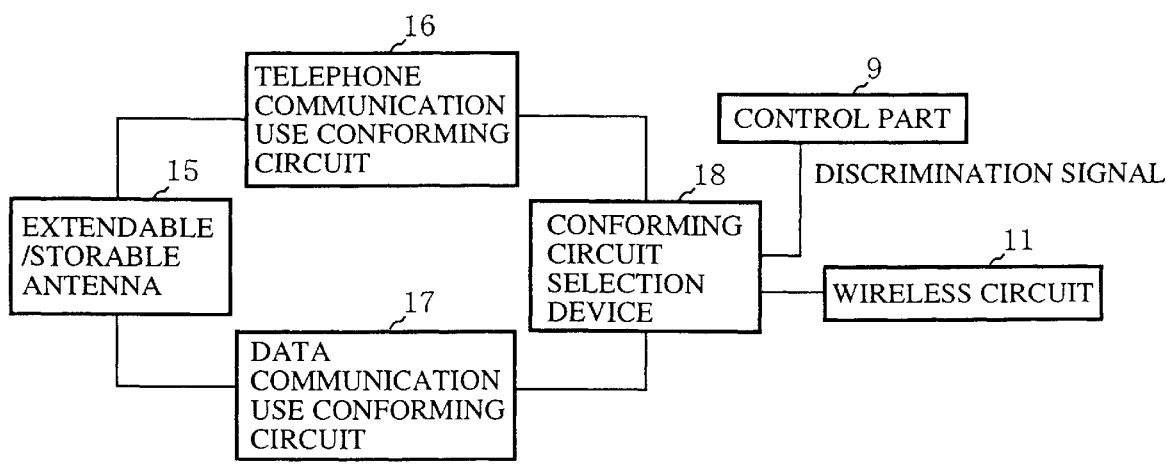
FIG. 6 is a block diagram showing the antenna device for use with a PDA according to fourth embodiment of the invention.
Figure 7:
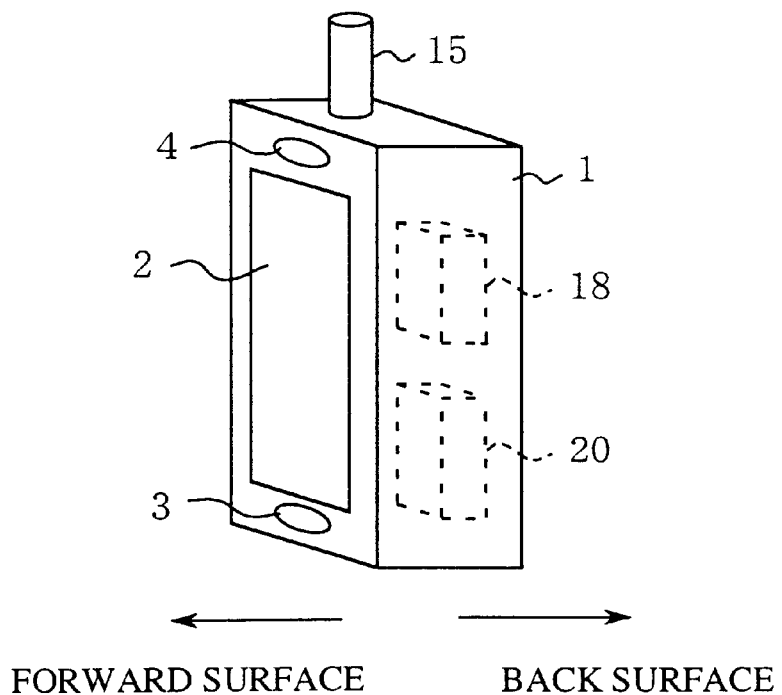
FIG. 7 is a perspective view showing the use condition of the antenna device for use with a PDA during telephone communication.
Figure 8:
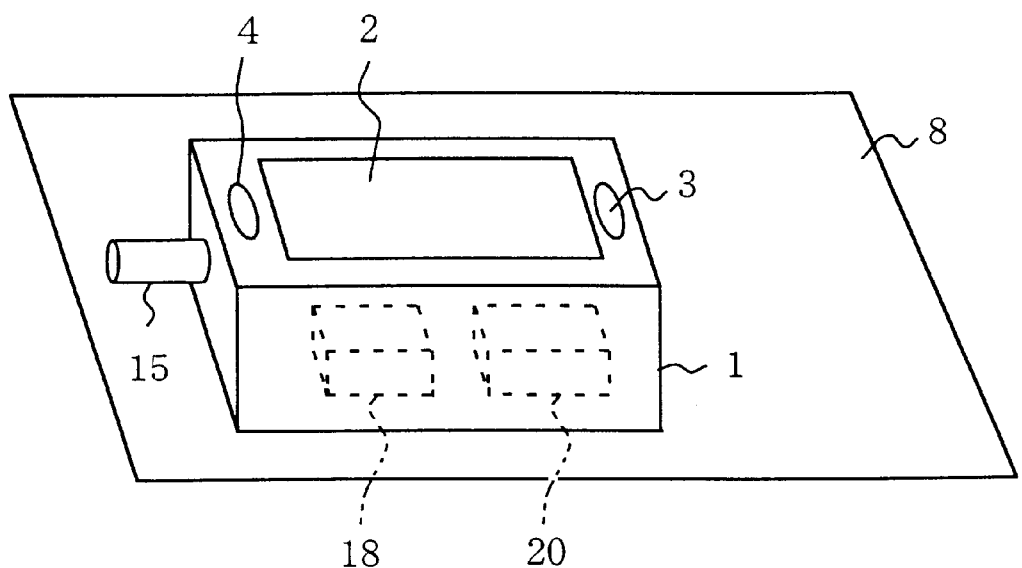
FIG. 8 is a perspective view showing the use conditions of the antenna device for use with a PDA during data communication.
Figure 9:
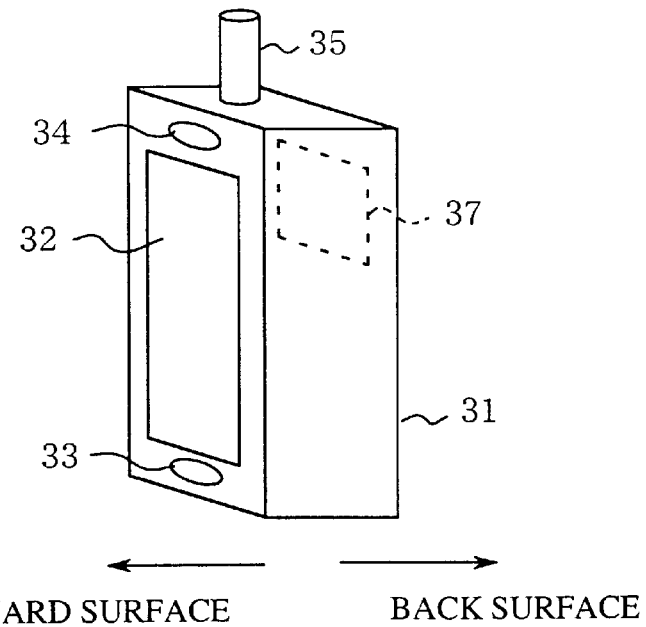
FIG. 9 is a perspective view of a PDA provided with a conventional antenna for use with a PDA.
Figure 10:
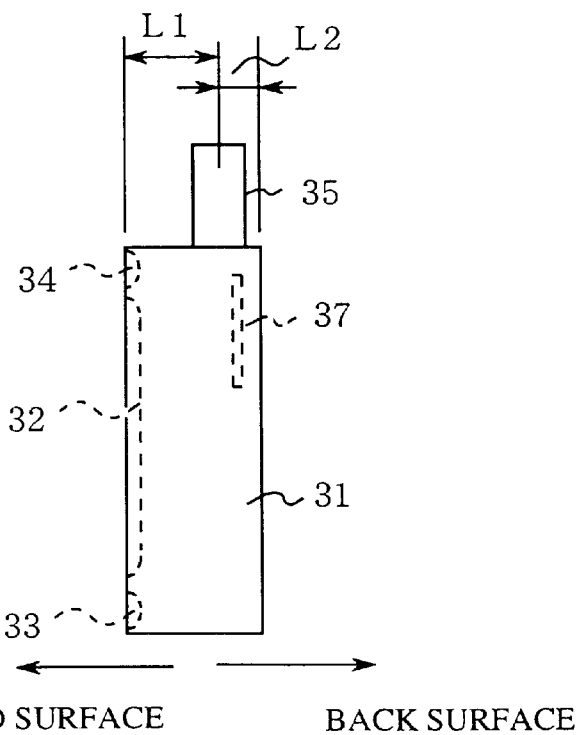
FIG. 10 is a side view showing a PDA provided with a conventional antenna device for use with a PDA.
Figure 11:
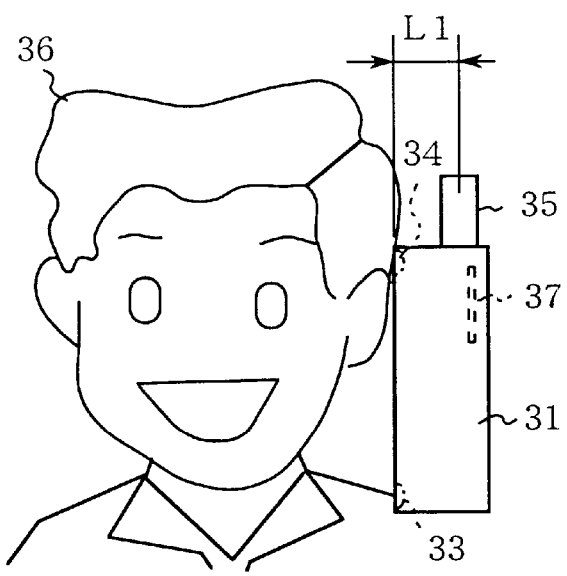
FIG. 11 is a side view showing a PDA during telephone communication.
Figure 12:
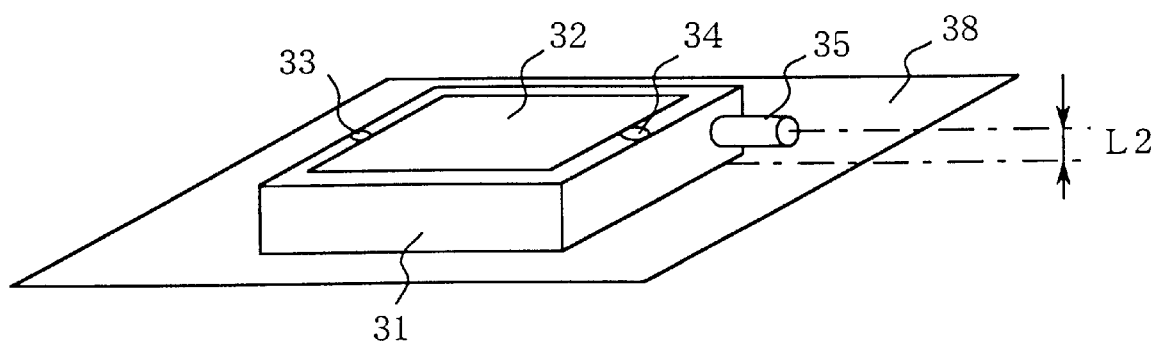
FIG. 12 is a perspective view of a PDA during data communication.
Figure 13:
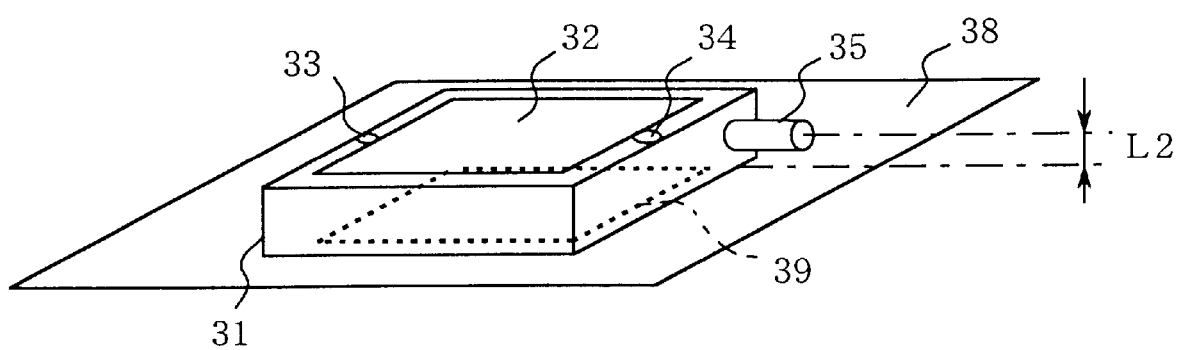
FIG. 13 is a perspective view showing a PDA with a built-in loop antenna.

FIG. 6 is a block diagram showing the PDA use antenna device according to embodiment 4 of the present invention. FIG. 7 is a perspective view showing the use conditions of the PDA use antenna device during telephone communication. FIG. 8 is a perspective view showing the use conditions of the PDA use antenna device during data communication.

In FIGS. 6–8, 15 is a extendable/storable antenna (antenna)used during telephone communication (a first use condition) and data communication (a second use condition) and is capable of being extended from or stored in the body 1. 16 is a telephone communication conforming circuit (first conforming circuit) which matches the impedance of the extendable/storable antenna 15 during telephone communication. 17 is a data communication conforming circuit (second conforming circuit) which matches the impedance of the extendable/storable antenna 15 during data communication. The conforming circuits 16,17 are formed by known and familiar technology to achieve the optimal conforming condition in each use condition.

18 is a conforming circuit selection device which selects which one of the telephone communication use conforming circuit 16 and the data communication use conforming circuit 17 to use on the basis of the use condition, that is to say, based on the discrimination signal of the control part 9 and which connects the extendable/storable antenna 15 to the wireless circuit 11 through the selected conforming circuit.

20 is an angle sensor (orientation sensor) which detects the orientation of the body 1 in order to discriminate use conditions and which is provided in the control part 9. In other words, during telephone communication, as shown in FIG. 7, the body 1 is stood upright during use. During data communication, as shown in FIG. 8, the body 1 is laid flat during use. Therefore use conditions are discriminated by the angle sensor 20 detecting differences in the orientation of the body 1 and outputting a discrimination signal to the matching circuit selection device 18.

The operation of the invention will now be explained.

The discrimination of use conditions such as telephone communication and data communication is automatically carried out by the sensor 20 detecting differences in the orientation of the body 1. A discrimination signal is then output to the conforming circuit selection device 18.

The conforming circuit selection device 18 selects which one of the telephone communication use conforming circuit 16 and the data communication use conforming circuit 17 to use based on the discrimination signal and connects the extendable/storable antenna 15 to the wireless circuit 11 through the selected conforming circuit.

In other words, when the use condition is determined to be telephone communication, the telephone communication use conforming circuit 16 is selected and the extendable/storable antenna 15 is connected to the wireless circuit 11 under that conforming condition. On the other hand, when the use condition is determined to be data communication, the data communication use conforming circuit 17 is selected and the extendable/storable antenna 15 is connected to the wireless circuit 11 under that conforming condition.

In this way, the extendable/storable antenna 15 is used under the optimal conforming conditions in each use condition and improved and stable antenna reliability is easily ensured.

In the above manner, according to embodiment 4, the discrimination of use conditions is easily achieved by the angle sensor 20 and optimal conforming conditions are easily ensured in each use condition. Improved and stable antenna reliability is easily ensured.

Embodiment 4 above was explained on the basis of using an angle sensor as the discriminating means of use conditions. However the invention is not limited in this respect and as long as the orientation of the body 1 is detected, any such detecting means may be used. Furthermore as explained in embodiment 1, the use condition may also be discriminated on the basis of an input signal due to input operations of the user.

The use conditions, as explained in embodiment 1, are not limited to telephone communication and data communication but may be applied in the same way to data communication/telephone communication and data processing.

Industrial Applicability

As shown above, the PDA use antenna device according to the present invention is adapted to easily ensure improved and stable antenna reliability notwithstanding use conditions such as telephone communication or data communication and furthermore is used to increase the reliability of the PDA unit.

What is claimed is:

1. A PDA use antenna device provided in a PDA unit which has at least a body and a wireless circuit for carrying out a data communication function and a telephone communication function, the PDA use antenna device comprising an antenna used in a first use condition and a second use condition, a first conforming circuit which conforms the impedance of said antenna to said first use condition as a function of positional orientation of said PDA unit, a second conforming circuit which conforms the impedance of said antenna to said second use condition as a function of positional orientation of said PDA unit, a control part which discriminates between said first use condition and said second use condition and outputs a discrimination signal, and a conforming circuit selection device which selects that one of said first conforming circuit and said second conforming circuit to use on the basis of the discrimination signal from said control part and connects said antenna to the wireless circuit through the selected conforming circuit.

2. A PDA use antenna device provided in a PDA unit which has at least a body and a wireless circuit for carrying out a data communication function and a telephone communication function, the PDA use antenna device comprising a first antenna used in a first use condition in which positional orientation of said PDA unit is optimized for use of said first antenna, a second antenna used in a second use condition in which positional orientation of said PDA unit is optimized for use of said second antenna, a control part which discriminates between said first use condition and said second use condition and outputs a discrimination signal, and an antenna selection device which selects that one of said first antenna and said second antenna to use on the basis of the discrimination signal from said control part and which connects the selected antenna to the wireless circuit;

wherein the use conditions comprise at least data communication, telephone communication, data/telephone communication carrying out both data communication and telephone communication, and data processing carrying out processing of fixed data prior to data communication and data/telephone communication, said telephone communication being a first use condition, said data communication and said data/telephone communication being a second use condition, and said data processing being a first use condition or a second use condition.

3. The PDA antenna device according to claim 2 wherein the second antenna is in the form of a pole and is adjustable with respect to at least one of its distance from or angle relative to an interference obstacle.

4. The PDA use antenna device according to claim 3 wherein the second antenna is capable of being extended from or stored in the body.

5. The PDA use antenna device according to claim 2 wherein an antenna installation cover is provided on the body and is capable of optionally changing the orientation of the antenna with respect to an interference obstacle, said second antenna being provided on the surface or in the interior of the antenna installation cover.

6. The PDA use antenna device according to claim 5 wherein the second antenna is formed by one of printing, deposition or transferal with respect to the antenna installation cover.

7. The PDA use antenna device according to claim 2 wherein the second antenna is provided in the part of the body which can optionally change its orientation with respect to the interference obstacle.

8. The PDA use antenna device according to claim 7 wherein the second antenna is formed by one of printing, deposition or transferal with respect to one part of the body.

9. The PDA use antenna device according to claim 3, wherein an orientation sensor which detects the orientation of the body in order to discriminate between a first use condition and a second use condition is provided in the control part.

* * * * *